Patented Nov. 27, 1951

2,576,895

UNITED STATES PATENT OFFICE 2,576,895

PREPARATION OF UREIDES

David E. Adelson, Berkeley, Calif., assignor to Shell Development Company, San Francisco, Calif., a corporation of Delaware No Drawing. Application May 16, 1949,
Serial No. 93,629

7 Claims. (Cl. 260—553)

This invention relates to a new method of producing allophanyl-substituted compounds which have valuable properties and also deals with the novel products of this reaction.

The allophanyl-substituted compounds with which the invention is concerned are those having the allophanyl group

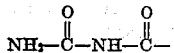

directly linked to a carbon atom. It has been found, unexpectedly, that compounds of this type can be produced advantageously by reacting biuret with organic compounds having a labile hydrogen atom attached to a carbon atom of the molecule. The reaction is carried out under conditions at which ammonia is split off and the corresponding allophanyl compound is produced.

There are a number of different labile hydrogen-containing compounds which may be used in the process successfully. These include, for example, hydrocarbons having a saturated tertiary carbon atom such, for instance, as isoparaffins, isoolefins, alkyl aromatic and alicyclic hydrocarbons having a tertiary carbon atom to which a hydrogen atom is attached. In these hydrocarbons the labile hydrogen atom is attached to the tertiary carbon atom. Another group of suitable hydrocarbons is that which forms alkali metal substitution products, the labile hydrogen atom in this case being the hydrogen which is replaced by the alkali metal. Typical hydrocarbons of this type which have been found useful in the new process are, for example, the fluorenes, indenes, acetylenes, and the like. Instead of the hydrocarbons, substitution products thereof having a labile hydrogen atom may be used provided the substituent or substituents are non-reactive under the conditions used. It has been found that substituents such, for instance, as the halogens, particularly fluorine and chlorine, nitro groups, ether, ester and keto groups, and the like are non-reactive under the conditions preferred for carrying out the new process and may be present in the starting labile hydrogen-containing compound without interfering with the desired formation of the allophanyl compound.

Another sub-group of labile hydrogen-containing compounds which are particularly useful starting materials for use in the present invention are the carbonyl compounds having a hydrogen atom (the labile hydrogen) attached to a carbon atom directly linked to the carbonyl carbon atom. Included among these compounds are, for example, the carboxylic acids and their esters and the ketones having a labile hydrogen atom. Especially suitable are compounds of this type having two carbonyl groups which are linked together by a single carbon atom to which a hydrogen atom is attached since the labile hydrogen atom is particularly reactive with biuret in such cases. Typical compounds of this type are, for instance, the malonates including substituted malonates, especially mono-alkyl malonic acid esters, glutaconic acid and its esters, beta-ketonic carboxylic acids and their esters of which acetoacetic ester is typical, and the beta-diketones which may be aliphatic, alicyclic, aromatic or carbocyclic. In many cases these compounds also are substituted by alkali metals such as sodium or potassium at the labile hydrogen atom which may be either on a methylene or a saturated methenyl group. Instead of the dicarbonylic compounds, the somewhat less reactive corresponding monocarbonylic acids, esters and ketones may be similarly used. In all cases compounds having non-reactive substituents such as those previously discussed in connection with the labile hydrogen-containing hydrocarbons may be used successfully instead of the corresponding mono- or poly-carbonyl compounds.

The chosen labile hydrogen-containing reactant may be a pure or substantially pure chemical compound or a mixture of two or more such compounds or a mixture of one or a plurality of labile hydrogen-containing compounds with other compounds which do not interfere with the reaction. Thus, for example, the tertiary carbon atom containing hydrocarbon may be a component of a hydrocarbon mixture, for instance, an isoparaffin-containing fraction of petroleum products or the like. Also, it is frequently advantageous in the interest of economy to use the labile hydrogen-containing compound in the crude form in which it naturally occurs or is initially produced, or as incompletely refined products from such sources. Fluorene, for instance, may be used in the form of suitable coal tar fractions containing other components which do not interfere with the reaction of the invention.

The conditions under which the reaction of biuret with the chosen labile hydrogen-containing compound or compounds is carried out will depend upon the particular labile hydrogen-containing compounds used. As a general rule, an elevated temperature of at least 100° C. is desirable and preferably temperatures of 110° C. to 250° C. are used, although higher temperatures up to the decomposition temperature of the product but preferably below 350° C. can be employed. The time of reaction will depend upon the temperature which is chosen and will be longer for lower temperatures than when temperatures nearer the upper limit of the permissible range are used. Also, longer times of reaction are desirable when using the less reactive labile hydrogen containing compounds such as isoparaffins or mono-ketones than when employing compounds which form alkali metal substitution products such as fluorene, diethyl malonate, etc.

As a general rule, it is desirable to carry out the reaction under conditions at which the ammonia produced is removed substantially as fast as it is formed in the reaction. To this end, it is advantageous to operate at a subatmospheric pressure. Most preferably, however, pressures are used at which both reactants are maintained in the liquid. However, the use of conditions under which the labile hydrogen-containing compound is volatilized is not excluded since by passing the exit gases through a condenser or reflux column or by other suitable means any unreacted labile hydrogen-containing compound present in the effluent can be recovered and returned to the reaction. Such procedure is especially applicable in the case of highly volatile reactants such as isobutane, for example. It is feasible in such, as well as other, cases to carry out the reaction in the gaseous state. Also, atmospheric or subatmospheric pressures may be used in both liquid and gas phase operations. As a general rule, however, it is preferred to operate in the liquid phase with pressures below 500 mm. Hg absolute, most preferably at pressures below 250 mm. Hg. Pressures of the order of about 1 to 20 mm. Hg have been found to be especially advantageous as products of superior quality and best color are usually obtained by operating in this range.

The ratio of the reactants which it will be most desirable to use will depend upon the particular labile hydrogen-containing compound chosen for reaction but, as a general rule, a stoichiometric excess of biuret over that required for reaction with the labile hydrogen present is preferred. Usually a mole ratio of biuret to labile hydrogen-containing compound of the order of 1.2:1 to 3:1 is preferred, although lower or higher ratios may be employed.

In some cases it is desirable to carry out the reaction in the presence of a mutual solvent for the biuret and labile hydrogen-containing compound since intimate contact of the reactants can be facilitated in this way and better control of the reaction can be achieved. Suitable mutual solvents are those which are non-reactive under the chosen conditions. For labile hydrogen-containing compounds which are soluble in hydrocarbons, solvents such as normal paraffins, e. g. hexane, heptane, octane, decane, cetane, etc., aromatics such as benzene, toluene and the like compounds free from labile hydrogen atoms are useful.

The process may be carried out batchwise, intermittently or continuously, continuous operation being most advantageous for large scale manufacture. Any suitable form of equipment or apparatus may be used to carry out the reaction. It is desirable in many cases to provide means for agitating the contents of the reaction vessel by shaking, stirring, agitating with an inert gas, etc. As previously pointed out, where low boiling materials are used as reactants, it is desirable to fit the reaction vessel with a condenser or suitable reflux equipment to avoid loss of material. Suitable heating means may also be employed in order to maintain the reactants at the desired or optimum temperature. Although the ammonia gas evolved may be vented to the atmosphere, it is often desirable to provide suitable apparatus for catching and recovering the ammonia gas emanating from the reaction mixture.

A number of different methods of working up the reaction product for recovery of the allophanyl compound produced are available. Thus, the product may be isolated and purified by distillation, extraction, fractionation, crystallization or any other suitable process. A preferred method for recovering the product is to cool the reaction mixture and then to treat it with a solvent in which the allophanyl compound is soluble to the substantial exclusion of the other components of the mixture, especially of the biuret which may be present in excess of the theoretical amount required. Any solvent which preferentially dissolves the allophanyl compound and does not react with it may be used for the extraction. Suitable solvents are the hydrocarbon solvents, the alcohols, the ethers, the ketones, certain esters and the like. Toluene and the hot acid octane have been found to be especially suitable solvents to use for isolating and purifying the allophanyl compounds.

The process of the invention is illustrated by the following examples which also show some of the many valuable new compounds obtainable according to the invention.

EXAMPLE I

A mixture of 1.5 moles of recrystallized fluorene and 2.25 moles of biuret was stirred and heated 76 hours at 140° C.–159° C. and 151 to 1 mm. pressure. During most of the reaction period the temperature was at 149° C.–156° C. and the pressure at 16–56 mm. At the end of the reaction the products were a pasty, semi-fluid mass. They were extracted with toluene and, after removal of the solvent, the residue was dissolved in hot alcohol. Upon cooling the solution to ice temperature, fluorene crystallized and was removed by filtration. Evaporation of the alcoholic filtrate yielded an oily mass which slowly crystallized. Analysis of the product indicated that it contained 9-allophanylfluorene, admixed with fluorene and an oxidation product of the latter, probably fluorenone.

|  | Found | Calculated Values | | |
|---|---|---|---|---|
|  |  | 9-Allophanyl-fluorene $C_{15}H_{12}O_2N_3$ | Fluorene $C_{13}H_{10}$ | Fluorenone $C_{13}H_8O$ |
|  | Per cent | Per cent | Per cent | Per cent |
| Carbon | 87.2 | 71.5 | 94.0 | 86.7 |
| Hydrogen | 5.2 | 4.8 | 6.0 | 4.4 |
| Nitrogen | 1.3 | 11.1 | 0 | 0 |
| Oxygen (by diff.) | 6.3 | 12.6 | 0 | 8.9 |

The following approximate composition is indicated:

11.7% 9-allophanylfluorene
54.0% fluorenone
34.3% fluorene corresponding to a yield of about 18% of 9-allophanylfluorene based on the fluorene reacted.

Under the same reaction conditions and substituting 1 - methyl - 7 - isopropyl - diphenylene-methane for the fluorene, 9-allophanyl retene-fluorene

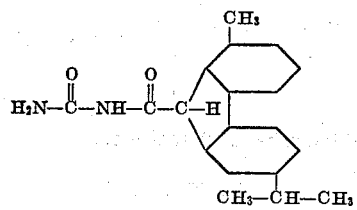

is obtained in approximately the same yield. When using diphenylene-phenyl-methane and biuret and maintaining the temperature above 146° C. throughout the reaction, 9-allophanyl, 9-phenyl-fluorene

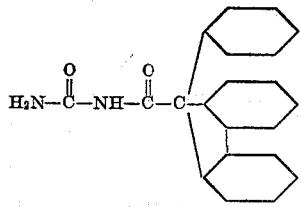

is likewise obtained. With diphenylmethane, alpha-allophanyl diphenyl methane

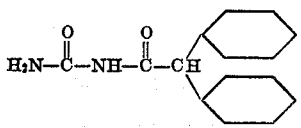

is obtained. For the reaction of chryso-fluorene with biuret, a lower boiling hydrocarbon solvent is preferably used and the 11-allophanyl chrysofluorene

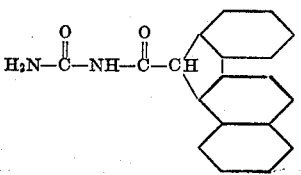

produced is recovered by distilling off the solvent.

EXAMPLE II

Biuret and 1,2,3-triphenylindene, in a mole ratio of 1.92 to 1, heated in a stirred reaction vessel in an oil bath for 19 hours at 140° C. while maintaining a pressure of 3 to 8 mm., give a good conversion to gamma-allophanyl 1,2,3-triphenyl-indene

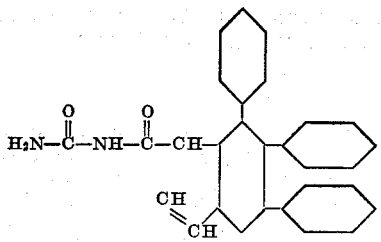

In the same way indene at 130° C. and 350 mm. Hg pressure for 26 hours gives gamma-allophanyl indene

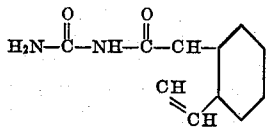

and gamma-methylindene at 150° C. and 200 mm. Hg pressure gives gamma,gamma-allophanyl methyl indene

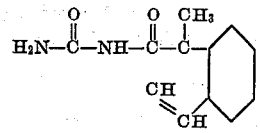

EXAMPLE III

Fifty parts by weight of dicyclopentadiene heated with 130 parts of biuret at 140° C. and 350 mm. Hg for 32 hours give allophanyl cyclopentadiene

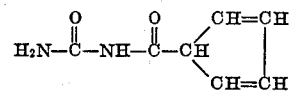

together with a higher boiling allophanyl compound, presumably allophanyldicyclopentadiene. The allophanyl cyclopentadiene is also obtained by heating cyclopentadiene with biuret under pressure in the presence of n-pentane as a solvent and diluent, but the yield in this case is not as high.

In the same way allophanyl propyl acetylene

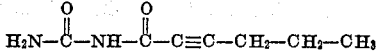

is obtained when propylacetylene is substituted for the cyclopentadiene, and allophanylphenyl-acetylene is obtained from phenyl acetylene.

EXAMPLE IV

Using isooctane boiling under reflux at atmospheric pressure and two moles of biuret per mole of isooctane, a low conversion to 4-allophanyl 2,2,4-trimethyl pentane is obtained.

With higher boiling isoparaffins such, for instance, as isododecanes, 2-methyl pentadecane, etc. using pressures of 200 to 300 mm. Hg, higher conversions to 4-allophanyl 2,2,4,6,6-pentamethyl heptane and 2-allophanyl 2-methyl pentadecane, respectively, are obtained.

EXAMPLE V

Biuret and diethyl malonate (molar ratio 1.5:1) are heated and stirred for 46 hours at 139° C.–142° C. and 95–145 mm. pressure. After extraction with n-butyl acetate, the product is isolated as a viscous, amber-colored liquid which is slightly soluble in western lubricating oil, SAE 20 grade and which analyzes as follows:

|  | Found | Calculated For NH$_2$CONHCOCH(COOC$_2$H$_5$)$_2$ |
|---|---|---|
| Per Cent Nitrogen | 12.7 | 11.4 |
| $n_D^{20}$ | [1] 1.467(2) |  |
| Acid value equiv./100 g | 0.03(6) | 0 |

[1] The refractive index ($n_D^{20}$) of diethyl malonate is reported to be 1.4143.

Using methyl malonic acid dimethyl ester in place of the ethyl malonate under the same conditions gives alpha-allophanyl dimethyl methyl-malonate

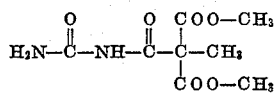

Other malonic esters are also suitable.

EXAMPLE VI

Acetoacetic ethyl ester heated at 150° C. with 3 moles of biuret under a pressure of 350 mm. Hg for 43 hours gives a good yield of alpha-allophanyl acetoacetic acid ethyl ester

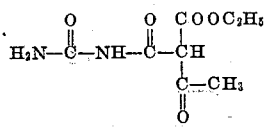

In the same way biuret reacts with ethyl acetoacetic methyl ester to give alpha,alpha-allophanyl methyl acetoacetic methyl ester

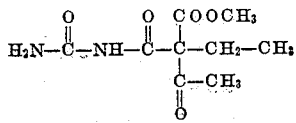

Acetylmalonic and ketosuccinic acid esters react in the same way under the same conditions. With ketoglutaric acid esters, however, di-allophanyl derivatives are also formed unless a substantial molar excess of ester to biuret is used. Thus, from beta-ketoglutaric acid ester one can obtain alpha-allophanyl beta-ketoglutaric acid ester

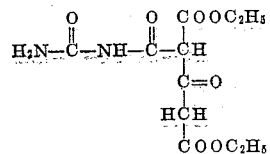

and/or alpha,gamma-diallophanyl beta-ketoglutaric acid ester

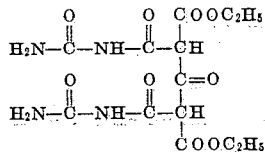

EXAMPLE VII

A mixture of about 5 parts by weight of dibenzoyl methane and 7 parts of biuret of about 90% purity reacted for 23 hours at 140° C. to 145° C. while maintaining a pressure of 100 to 150 mm. Hg and taking off the evolved gases, mainly ammonia, through a sulfuric acid trap, gives a good yield of allophanyl dibenzoyl methane

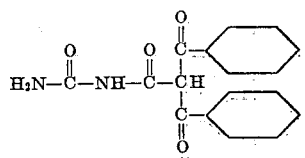

Under the same conditions 3-allophanyl-2,4-nonanedione

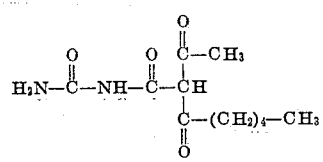

is obtained from acetyl caproyl methane, and allophanyl benzoyl acetyl methane

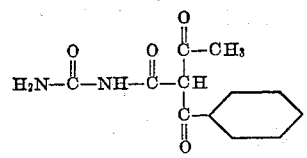

is obtained from benzoyl acetone.

EXAMPLE VIII

Reacting a mixture of benzyl-propyl ketone and biuret in a mole ratio of 2.5:1 at 133° C. and 130 mm. Hg gives 4-allophanyl-4-phenyl-3-butanone

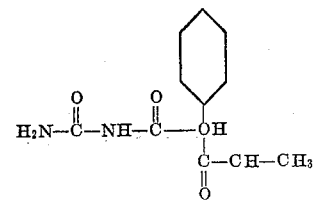

d-Carvone reacts similarly with biuret to produce allophanyl carvone

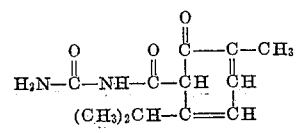

EXAMPLE IX

Thianaphthene and biuret in a mole ratio of 1:3, reacted at 148° C. and 120 mm. Hg pressure for 47 hours, give 3-allophanyl benzothiophene

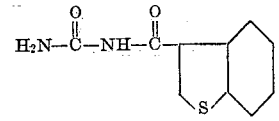

In an analogous manner thiophene gives 2-allophanyl thiophene.

From these illustrative examples it will be seen that the process of the invention is applicable to a wide variety of different organic compounds having a carbon atom to which a labile hydrogen atom is directly attached. It will be understood, however, that the process is not limited to the compounds used by way of illustration in the examples since a great many other compounds are operative in the new reaction and produce valuable new products. Among such other useful starting materials are, for instance:

I. Hydrocarbons

A. Having the labile hydrogen atom attached to a saturated tertiary carbon atom, for example: isobutane, isopentane, cumene, diisopropylbenzene, isobutyl naphthylene, cymene, etc.

B. Having the labile hydrogen atom attached to an acetylenic carbon atom, as: butine, crotonylene, pentine, valerylene, hexine, hexoylene, heptine, phenyl acetylene, oenanthylidene, octine, caprylidene, decine, menthene, dodecylidene, their homologues and analogues.

C. Having the labile hydrogen atom attached to a saturated carbon atom directly linked to an aromatic hydrocarbon ring, for example: phenyl tolyl methanes, unsymmetrical diphenylethane, triphenylmethane, diphenyl-p-tolylmethane, bidiphenyleneethane, fluoranthene, etc.

II. Carbonyl compounds

A. KETONES (1) Aliphatic (saturated and unsaturated)—

| | |
|---|---|
| Acetone | Phorone |
| Butanone | Pentanedione |
| Hexanone | Mesityl oxide |
| Oleone | Diethyl ketone |
| Palmitone | 3-methyl-heptanone |
| Methylethyl ketone | Diisobutyl ketone |
| Methylpropyl ketone | Diacetone alcohol |
| Butyrone | Allyl acetone |
| Butenone | Diallyl acetone |
| Vinylethyl ketone | Dioleyl ketone |
| Pentanone | |

(2) Aromatic—

| | |
|---|---|
| Phlorobenzophenone | Benzyl phenyl ketone |
| Hydroxy-acetophenone | Hydroxy benzophenone |
| Propiophenone | Benzoin |
| Dibenzyl ketone | Butine |

B. ALDEHYDES (1) Aliphatic (saturated and unsaturated)—

| | |
|---|---|
| Acetaldehyde | Citral |
| Propionaldehyde | Tiglic aldehyde |
| Butyraldehyde | Propiolaldehyde |
| Caproaldehyde | Valeraldehyde |
| Acrolein | Oleyl valeraldehyde |
| Chloral | Acetals |
| Crotonaldehyde | |

(2) Aromatic—

| | |
|---|---|
| Benzaldehyde | Naphthaldehyde |
| Cinnamaldehyde | Tolualdehyde |
| Salicylaldehyde | Anisaldehyde |

C. ACIDS AND THEIR ESTERS

| | |
|---|---|
| Acetic acid | Pimelic acid |
| Phenyl acetic acid | Azelic acid |
| Abietic acid | Brassylic acid |
| Adipic acid | Alkylene maleic acid |
| Pyroaceric acid | Glycollic acid |
| Propanyl formic acid | Thiodiglycollic acid |
| Butyryl formic acid | Itaconic acid |
| Aceto butyric acid | Citraconic acid |
| Licanic acid | Mesaconic acid |
| 12-keto stearic acid | Glutaconic acid |
| 13-keto behenic acid | Tartronic acid |
| Aldovaleric acid | Malic acid |
| Mucolactonic acid | Aspartic acid |
| Formylacrylic acid | |

D. ESTERS OF CARBOXYLIC ACIDS

Esters of any of the foregoing carboxylic acids with any of the following alcohols:

| | |
|---|---|
| Methyl alcohol | Allyl alcohol |
| Ethyl alcohol | Methallyl alcohol |
| Propyl alcohol | Crotyl alcohol |
| Isopropyl alcohol | 2-propyn-1-ol |
| n-Butyl alcohol | Oleyl alcohol |
| Isobutyl alcohol | Geraniol |
| Secondary butyl alcohol | Citronellol |
| Tertiary butyl alcohol | Linalool |
| Amyl alcohol | Farnesol |
| Hexyl alcohol | Phytol |
| Octyl alcohol | Cyclohexanol |
| Decyl alcohol | Naphthenic alcohol |
| Lauryl alcohol | Benzyl alcohol |
| Myristyl alcohol | Tolyl alcohol |
| Cetyl alcohol | Phenyl ethyl alcohol |
| Stearyl alcohol | Octadecylbenzyl alcohol |

Some of the specific esters contemplated are:

| | |
|---|---|
| Allyl acetate | Dimethyl sebacate |
| Allyl propionate | Ethyl isobutyrate |
| Allyl laurate | Dibutyl tartronate ethyl ether |
| Allyl capronate | |
| Allyl isovalerate | Dimethyl suberate |
| Allyl stearate | Dimethyl azelate |
| Allyl acrylate | Dioctyl sebacate |
| Methyl crotonate | Dioctyl succinate |
| Methyl acrylate | Allyl metallyloxyacetate |
| Allyl alloxylacetic acid | Glyceryl ricinoleate |
| Methyl ricinoleate | Glyceryl oleate |
| Di-sec-butyl diglycolate | Allyl succinate |
| Triethyl methoxy citrate | Sorbitan oleate |

Naturally occurring esters such as:

| | |
|---|---|
| Castor oil | Neat's-foot oil |
| Cocoanut oil | Palm oil |
| Corn oil | Peanut oil |
| Cottonseed oil | Sperm oil |
| Horse fat | Carnauba wax |
| Lard oil | Spermaceti |
| Wool fat | Beeswax |
| Japan wax | Rapeseed oil |
| Mutton tallow | Soya bean oil |
| Beef tallow | Whale oil |

III. Active hydrogen-containing heterocyclic compounds

| | |
|---|---|
| Thiophene | 3-methylfuran |
| 3-methylthiophene | Nitrofuran |
| Halothiophenes | Coumarone |
| Methyl thienyl ketone | Isocoumarone |
| Benzoylthiophene | Thiophthene |
| Furan | Thieno[3,2-b]thiophene |

In all these heterocyclic compounds the active hydrogen replaced by the allophanyl group in the reaction of the invention is on the carbon atom in alpha position with respect to the hetero atom or atoms present, or on the next adjoining carbon atom. With diphenylene oxide, dibenzothiophenes and the like, which react with biuret in the same way, the allophanyl group substitutes on the hydrogen-containing carbon atom nearest the hetero atom. Thus, 4-allophanyl dibenzothiophene is formed when dibenzothiophene is used as the starting material.

The products of the invention have many valuable properties which make them useful in a variety of industrially imported applications. Those which are oil-soluble are, as a class, very valuable lubricating oil additives, as described in more detail and claimed in copending application of Adelson and Larsen, Serial No. 46,558, filed August 27, 1948, of which the present application is a continuation-in-part. The new compounds are also useful antioxidants for natural and synthetic rubbers and other organic materials which are subject to oxidative deterioration, particularly fats and oils. Relatively small amounts are effective in retarding oxidation and, generally, it is not necessary to use more than 5% by weight of the allophanyl compound, and preferably about 0.1% to 2% by weight when applying the new compounds as antioxidants.

The products having 10 or more carbon atoms in a chain, particularly 2-allophanyl 4-methylpentadecane and the like, have detergent and wetting properties and may be used in cleaning compositions, as textile treating agents, and in the preparation of emulsions and the like.

The allophanyl derivatives of ketones and esters are useful plasticizers and softeners for the artificial and natural resins with which they are compatible. The products from the unsaturated esters, for instance, alpha-allophanyl diallyl or divinyl malonates, are capable of polymerization to useful resins, the copolymers with other polymerizable compounds such as vinyl chloride, vinyl acetate, diallyl phthalate, styrene, etc. being especially advantageous, particularly when the allophanyl ester represents about 25% to 75% by weight of the starting mixture of monomers.

The allophanyl ketone compounds of the invention, such as 3-allophanyl-2-butanone, 1-allophanyl-2-propanone, 2-allophanyl-cyclohexanone, etc., undergo condensation with other ketones, for example, acetone, methyl ethyl ketone, mesityl oxide and the like, to produce resinous products varying from viscous liquids to hard, clear solids. The allophanyl derivatives of dicarboxylic acids, for instance, alpha-allophanyl malonic acid and the like, are useful starting materials for the preparation of alkyd resins by reaction with polyhydroxy alcohols such as glycerine, ethylene glycol, polyvinyl alcohol, etc.

By reaction with alcohols, whether mono- or polyhydroxy, at temperatures of the order of 50° C. to 200° C., preferably under reduced pressure, the terminal amine group of the new compounds is split off as ammonia and is substituted by the oxy radical of the alcohol used, forming an ester linkage. Still other reactions may be carried out with the new compounds of the invention which will thus be seen to offer many advantages in widely different applications. It will therefore be clear that the invention is not limited to the examples which are merely given as illustrative of the diverse compounds and their uses made possible by the invention.

I claim as my invention:

1. A process of producing an allophanyl-substituted hydrocarbon which comprises reacting biuret with a hydrocarbon having a labile hydrogen atom selected from the class consisting of isoalkylaryl hydrocarbons, isoalkanes, 1-alkines, aralkylidyne-methane hydrocarbons having hydrogen on the methane carbon, polyarylmethane hydrocarbons having hydrogen on the methane carbon, and indene hydrocarbons having hydrogen on the saturated carbon of the indene nucleus at a temperature between about 50° C. and about 350° C. whereby ammonia is formed and an allophanyl-substituted hydrocarbon is produced.

2. A process of producing an allophanyl-substituted isoalkyl-aryl hydrocarbon which comprises reacting biuret with an isoalkyl-aryl hydrocarbon at a temperature between 50° C. and 350° C. at which ammonia is formed and an allophanyl group is substituted on said carbon atom, and removing the ammonia produced substantially as fast as it is formed.

3. A process of producing an allophanyl-substituted indene hydrocarbon which comprises reacting biuret with an indene hydrocarbon having a hydrogen atom attached to the saturated carbon atom of the indene nucleus in a mole ratio of about 1.2:1 to 3:1 at an absolute pressure of 1 to 500 mm. of mercury and a temperature between 50° C. and 350° C. whereby the ammonia formed is removed from the reaction mixture substantially as fast as it is produced and an allophanyl group is substituted on said carbon atom.

4. A process of producing an allophanyl-substituted aromatic hydrocarbon which comprises reacting biuret with a polyarylmethane hydrocarbon having a hydrogen atom attached to the methane carbon atom at a subatmospheric pressure and a temperature between 100° C. and 250° C. whereby ammonia is formed and an allophanyl group is substituted on said carbon atom.

5. A process of producing an allophanyl-substituted hydrocarbon which comprises reacting biuret with a biphenylene-methane hydrocarbon having hydrogen on the methane carbon atom at a temperature between about 50° C. and about 350° C. whereby ammonia is formed and an allophanyl-substituted hydrocarbon is produced.

6. A process of producing alpha-allophanyl fluorene which comprises heating fluorene with a molar excess of biuret at a temperature of 100° C. to 250° C. whereby ammonia and alpha-allophanyl fluorene are formed.

7. A process of producing an allophanyl trialkyl methane which comprises heating together an isoparaffin and a molar excess of biuret at 100° C. to 350° C.

DAVID E. ADELSON.

REFERENCES CITED

The following references are of record in the file of this patent:

UNITED STATES PATENTS

| Number | Name | Date |
|---|---|---|
| 996,096 | Kropp et al. | June 27, 1911 |
| 2,352,796 | McLeod | July 4, 1944 |
| 2,362,768 | Morgan et al. | Nov. 14, 1944 |
| 2,378,110 | Simons et al. | June 12, 1945 |

FOREIGN PATENTS

| Number | Country | Date |
|---|---|---|
| 53,379 | Austria | Apr. 30, 1911 |
| 620,903 | Germany | Oct. 30, 1935 |

OTHER REFERENCES

Zetsche et al.: "Ber. Deut. Chem.," vol. 72, August 2, 1939, pages 1602 and 1611.

Stoughton et al.: "J. Am. Chem. Soc.," vol. 61, 1939, pages 408 to 410.

Chemical Abstracts, vol. 5 (1911) page 2641 (abstract of Billows, "Riv. Min. Grist," vol. 33, pages 87 to 94).

Barnes et al.: "J. Am. Chem. Soc.," vol. 59, November 1937, pp. 2348 to 2351.